United States Patent [19]
Feamster, III

[11] 3,839,791
[45] Oct. 8, 1974

[54] PIPE CUTTING AND PREPING DEVICE

[75] Inventor: William C. Feamster, III, Portsmouth, Va.

[73] Assignee: Compac-Cutting Machine Corp., Norfolk, Va.

[22] Filed: Feb. 13, 1973

[21] Appl. No.: 332,232

[52] U.S. Cl. .......................................... 30/97, 30/98
[51] Int. Cl. .......................... B23d 21/06, B26d 3/16
[58] Field of Search ............ 30/92, 93, 99, 101, 102

[56] References Cited
UNITED STATES PATENTS

| | | | |
|---|---|---|---|
| 2,478,684 | 8/1949 | Brooks | 269/43 X |
| 2,747,274 | 5/1956 | Willard et al. | 30/97 |
| 2,769,234 | 11/1956 | Young | 30/97 |
| 3,253,336 | 5/1966 | Brown | 30/98 |
| 3,357,100 | 12/1967 | Lennon et al. | 30/98 |
| 3,431,646 | 3/1969 | Young | 30/98 X |

Primary Examiner—Al Lawrence Smith
Assistant Examiner—J. T. Zatarga
Attorney, Agent, or Firm—Mason, Fenwick & Lawrence

[57] ABSTRACT

A pipe cutting and end preparing device for use in severely confined quarters, wherein a collet, cam washer and collet nut, each of semi-circular segments, are adapted to be disposed about a pipe within a collar formed of semi-circular segments, which in turn rotatably supports a tool carriage ring and ring gear concentric with the pipe axis. A supporting framework of hinged together members surrounds the collar in assembled condition. A tool carrier is advanced periodically upon rotation of the carriage ring. Removable locking or holding pin paralleling the pipe axis hold the various segments in properly assembled relation.

20 Claims, 8 Drawing Figures

PIPE CUTTING AND PREPING DEVICE

BACKGROUND AND OBJECTS OF THE INVENTION

The present invention relates in general to pipe cutters or tube cutters, and more particularly to pipe or tube cutters of the segmented collar type designed to be installed in surrounding relation about a pipe in an existing installation to cut the pipe and prepare the end being cut for rewelding.

There are many types of tube cutters or pipe cutters known in the art. Typically these pipe cutters or tube cutters include a cutting wheel and rollers mounted on a curved frame entirely surrounding or partially surrounding the pipe and include a handle for turning the cutter. Some of the cutters rely on a spring for resiliently forcing the cutter into the conduit or pipe, while other cutters employ an adjustable screw mechanism for forcing the cutter wheel into engagement with the pipe and for regulating the cutting force as the wheel penetrates the wall of the pipe. Cutting tubing and pipes in cramped and confined locations, as where pipe sections must be removed and new sections welded on to repair heating or fluid conduit systems, are an extremely tedious and time consuming operation when performed by available pipe cutters. Often numerous shifts of the pipe cutter on the tubing are required to complete the operation. In the extremely confined or close quarters encountered in many pipe and conduit installations in naval vessels, particularly submarines, the problem of rapidly and effectively cutting off pipe and preparing it (frequently referred to as "preping") for rewelding is particularly severe. Most of the pipe cutters which have elongated drive screw handles for advancing the cutter wheel into the pipe and which must be rotated through a 360° arc, are too large to be used effectively in such installations. Some effort has been made to alleviate these problems by providing a pipe cutting and preparing tool in the form of a plurality of segments which may be fitted together to form a collar encircling the pipe, and which has a rotating collar portion carrying the cutter tool which is driven by a gear mechanism around the pipe to form the cut and prepare the cut surface. However, this prior art device employs screws or bolts at right angles to the planes of separation between the segments and extends through openings in one of the segments into threaded openings in the other segments to hold the segments together, and requires a cutter of such large size diametrically as to render it difficult to use in very confined spaces. Because of the mechanism provided for assembly and disassembly of the components, the assembly and disassembly procedure is slow and tedious, requiring approximately 25 to 30 minutes to complete the assembly of the cutting apparatus about the pipe, and because of the structure and the limited resistance to stripping of the screws which hold the components together, the speed at which the rotary components are driven is severely limited.

An object of the present invention is the provision of novel pipe cutting apparatus for cutting off pipe and preparing it for rewelding, which is of a segmented collar type construction having components which can be readily assembly together in a much shorter period of time than comparable prior art devices, and wherein the components making up the collar which is to be assembled in surrounding relation to the pipe are held together with great holding force superior to that achieved by the bolt assembly systems of comparable prior art devices, and which are of smaller size than comparable prior devices rendering them suitable for use in more confined locations.

Another object of the present invention is the provision of a novel pipe cutting apparatus for cutting off pipe and preparing it for rewelding in very confined quarters in existing pipe installations, wherein the apparatus is of the segmented collar type characterized by a capacity to be readily assembled about the pipe or disassembled from surrounding relation to the pipe and which has a strong holding force retaining the components in assembled relation when the apparatus is assembled about the pipe anc occupies a minimum space.

Another object of the present invention is the provision of novel pipe cutting and preparing apparatus as described in the immediately preceding paragraph, which permits assembly and disassembly at high speed and which facilitates higher speed operation of the movable cutting components of the apparatus.

Other objects, advantages and capabilities of the present invention will become apparent from the following detailed description, taken in conjunction with the accompanying drawings illustrating a preferred embodiment of the invention.

DETAILED DESCRIPTION OF A PREFERRED EMBODIMENT

Figure 1:
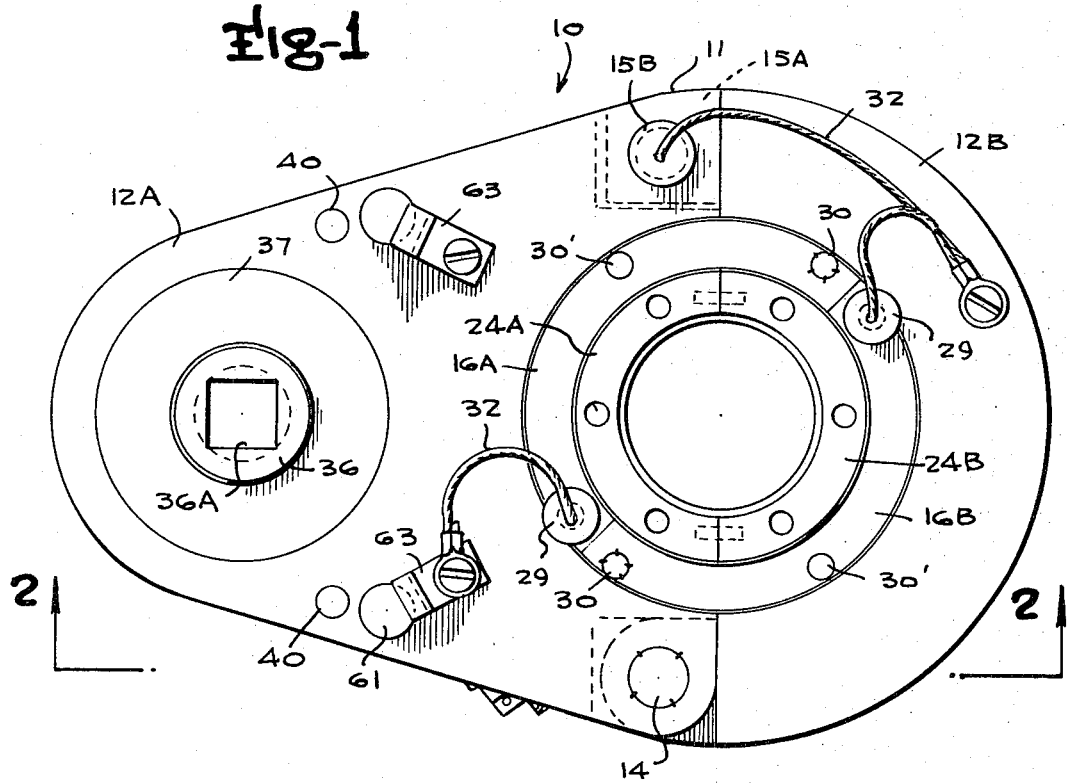
FIG. 1 is a side elevation view of the pipe cutting and preparing apparatus of the present invention, shown in closed position.
Figure 2:
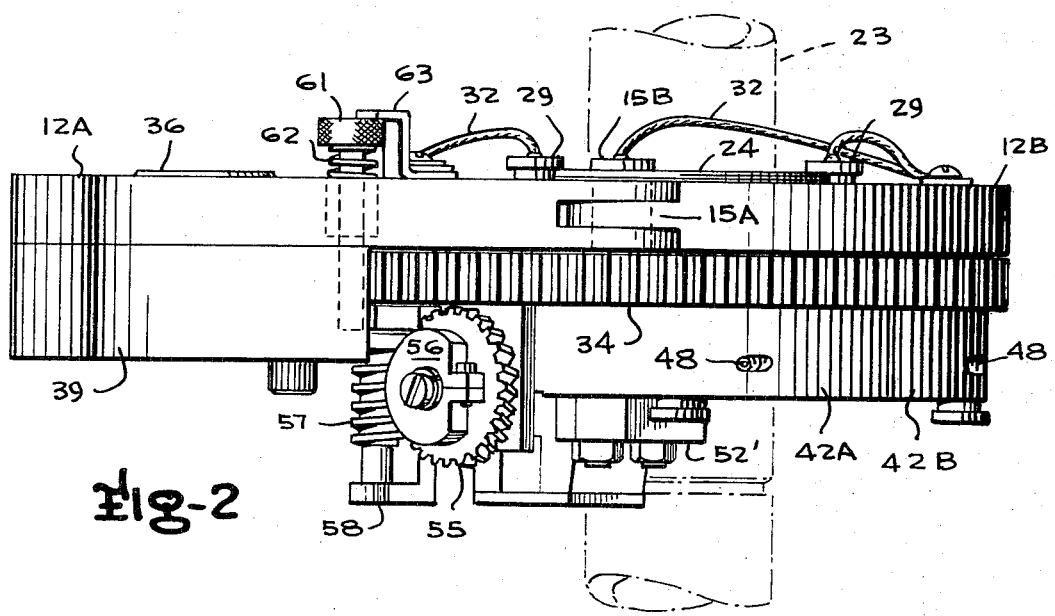
FIG. 2 is a bottom elevation view thereof, viewed from the lines 2—2 of FIG. 1.

Referring to the drawings, wherein like reference characters designate corresponding parts throughout the several figures, the pipe cutting and preparing device of the present invention is indicated generally by the reference character 10, and comprises, in the closed position which it occupies when assembled about a pipe to cut the pipe and prepare the cut end for rewelding, an annular collar-like encircling body 11 surrounding the pipe and having a generally circular ring like portion with a radial extension projecting outwardly at one position. The pipe cutter device 10 includes a housing assembly 12 formed of a female housing member 12A defining a semi-circular recess 13A and a male housing member 12B in the shape of a half ring having a semi-circular recess 13B to collectively define a circular opening with the recess 13A. The male housing member 12B has an apertured hinge ear projecting to a recess in the confronting portion of the female housing member 12A and coupled thereto by a pivot pin 14 to pivotally connect these two members together, while the opposite end of the male housing member 12B has an apertured locking ear 15A adapted to interfit in a mating recess in the female housing member 12A and be retained therein by a locking pin 15B to releasibly lock the two housing members 12A and 12B in closed position.

Figure 4:
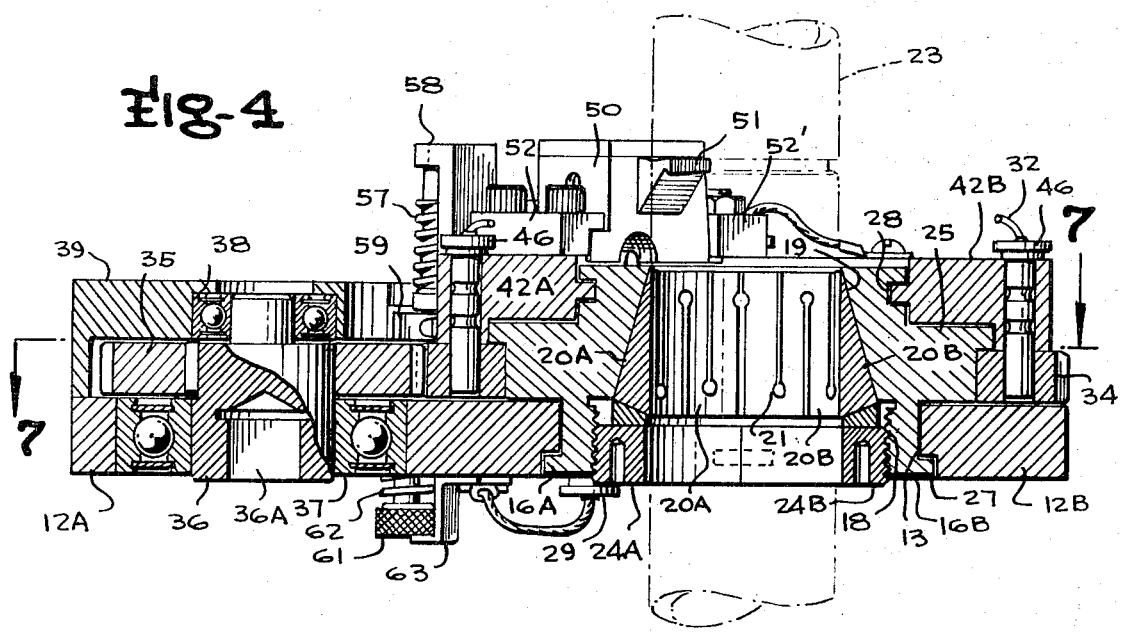
FIG. 4 is a horizontal longitudinal section view, taken along the line 4—4 of FIG. 3.
Figure 5:
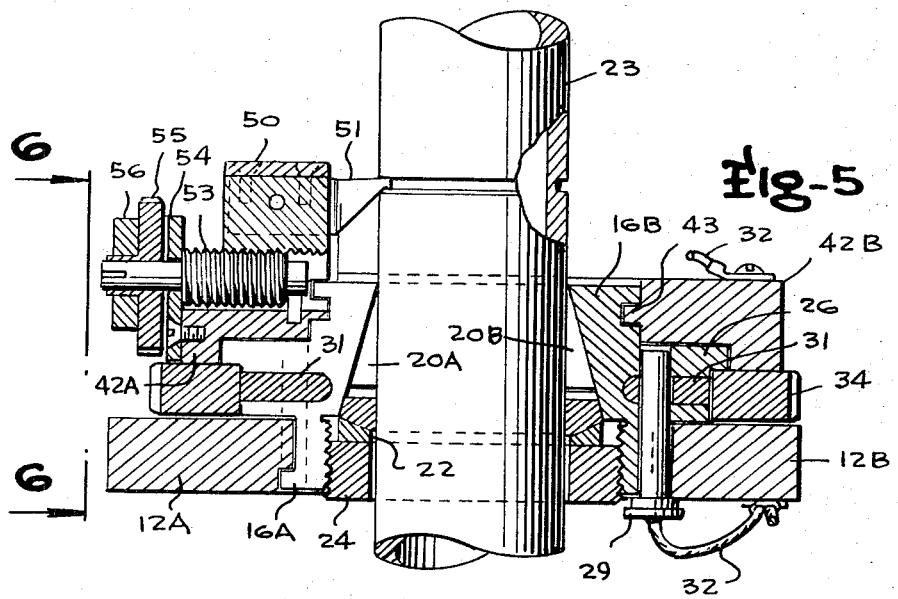
FIG. 5 is a diametric section view taken along the line 5—5 of FIG. 3.
Figure 8:
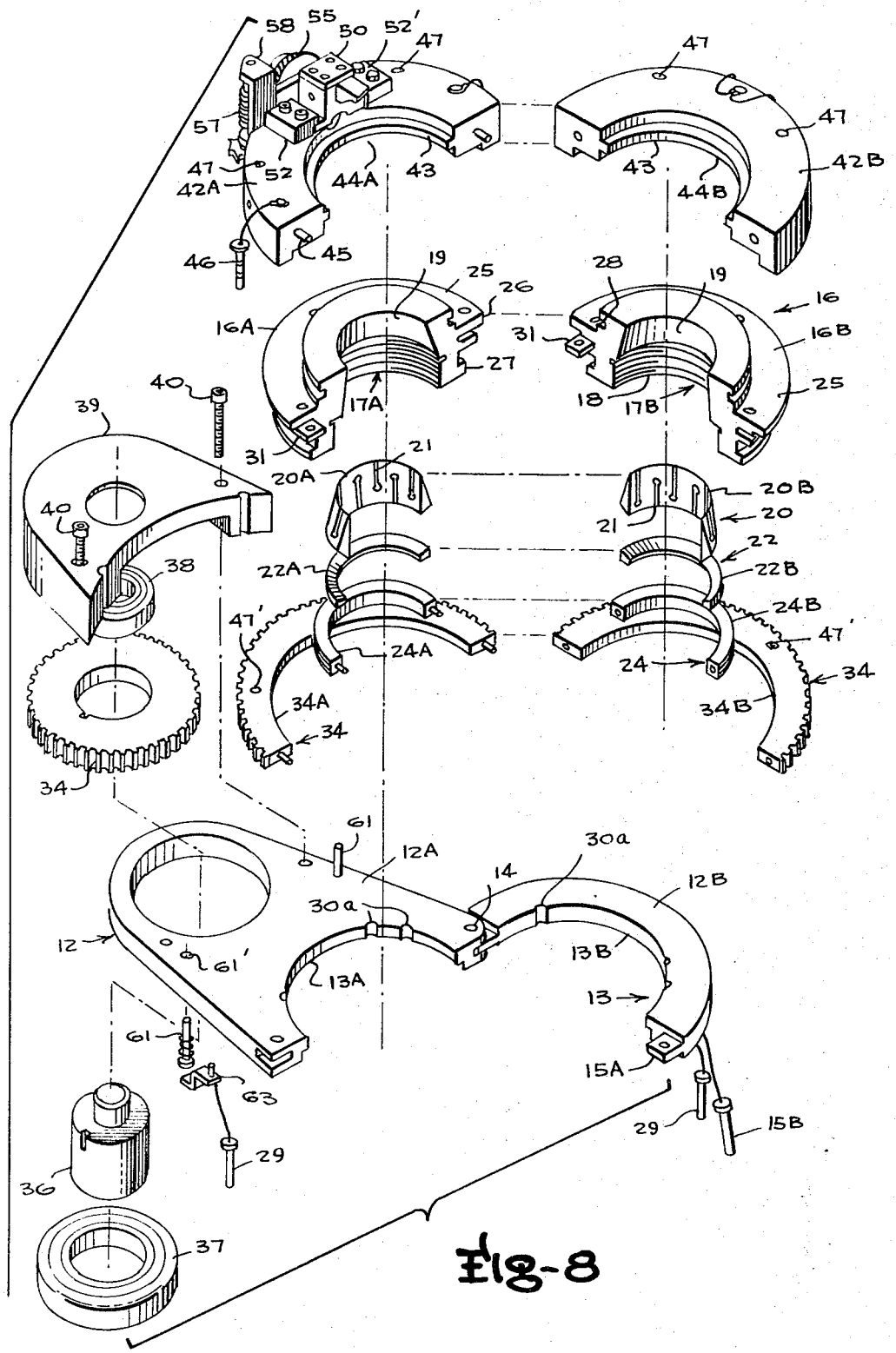
FIG. 8 is an exploded perspective view of the pipe cutter and preparing device.

Rotatably carried by the housing assembly 12 in journaled relation within the opening 13 defined by the semi-circular recesses 13A and 13B is a segmented annular body assembly 16 made up of two semi-circular annular body segments 16A and 16B having semi-circular recesses 17A and 17B collectively defining a central opening having a threaded portion 18 adjacent one end, which is the lower end in FIGS. 4, 5 and 8, and having a truncated conical surface formation 19 extending from the threaded portion to the upper end as viewed in these figures. The truncated conical center opening or bore portion formed by the surfaces 19 are designed to receive and properly locate within the center opening the two halves 20A and 20B of a split annular collet formed of two semi-circular segments each having a substantially triangular cross-section as illustrated in the drawings and having cuts 21 extending through the major portion of the axial length of the collet segments and spaced circumferentially thereof, with alternate cuts opening through opposite ends of the collet segments to render the collet flexibly deformable. A split washer of segments 22A, 22B of truncated triangular cross-section having a surface confronting and conforming to the adjacent surface of the collet is fitted in the center opening of the body assembly against the collet, and is forced against the collet segments to cam them into tightly clamping relation with the pipe 23 extending therethrough by threading the collet nut 24 formed of semi-circular segments 24A and 24B into the threaded portion 18 of the center opening 17.

The exterior of the body segments 16A and 16B are shaped to define an intermediate enlarged diameter shoulder portion 25 having a radially outwardly projecting annular lip 26 defining a circumferential ledge spaced from the confronting surface of the housing members 12A and 12B, and the lower end of the body assembly 16, as viewed in FIGS. 4 and 5, is likewise provided with a circumferential lip 27 which interfits into a conforming circumferential rabbet or recess in the lower end of the center opening 13 of the housing assembly as viewed in FIG. 4. The upper end portion of the body assembly 16 is provided with a circumferential groove 28 spaced a short distance from the upper end of the body assembly 16.

Figure 7:
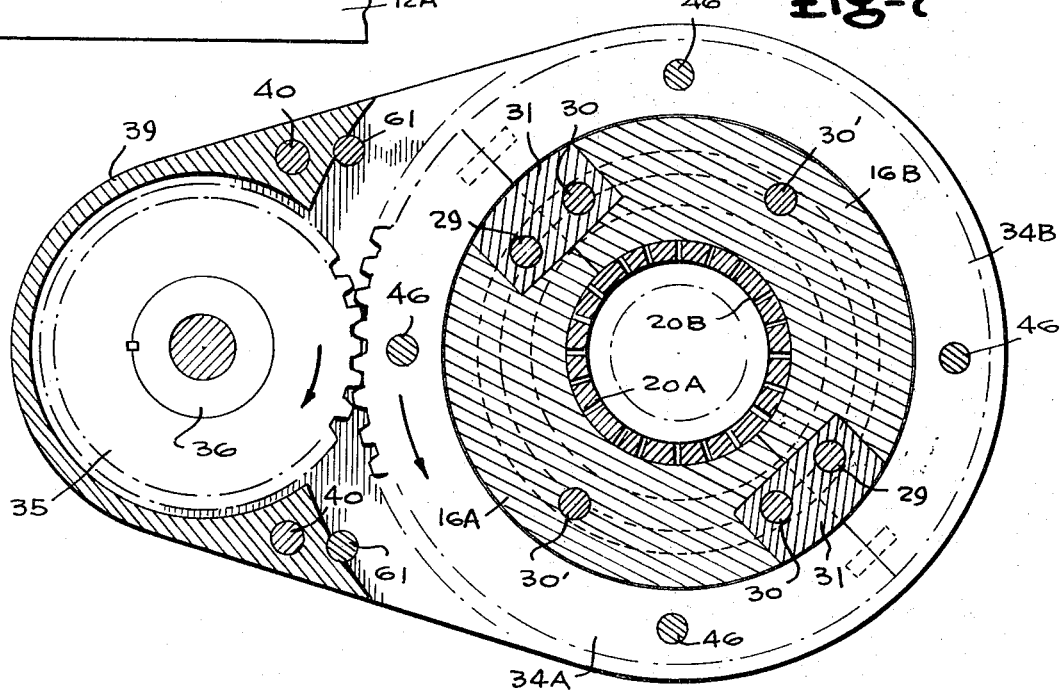
FIG. 7 is a longitudinal section view taken along the line 7—7 of FIG. 4.

The two semi-circular segments 16A and 16B of the body aseembly are releasibly but securely fastened together in the closed position by securing pins 29 and 30 extending through openings along axes parallel to the axis of the pipe 23 and center opening adjacent to the diametric plane of separation between the body segments in flanking relation to the same at two diametrically opposite positions as best shown in FIG. 7. These pins 29, 30 extend through registering openings in the body segments 16A, 16B and through a coupling plate or clip 31 fitted in correspondingly shaped recesses in the adjoining corner portions of the body segments adjacent the plane of separation. In practice, the pins 30 may be tightly press fitted into one of the body segments, for example the segment 16B, and remain in position to hold the coupling plates or clips 31 therein while the pins 29 may have enlarged heads to remain exposed externally of the body portion and be fastened by lanyards, as indicated at 32 to facilitate extraction of the holding pins 29 and prevent their accidental loss.

Figure 3:
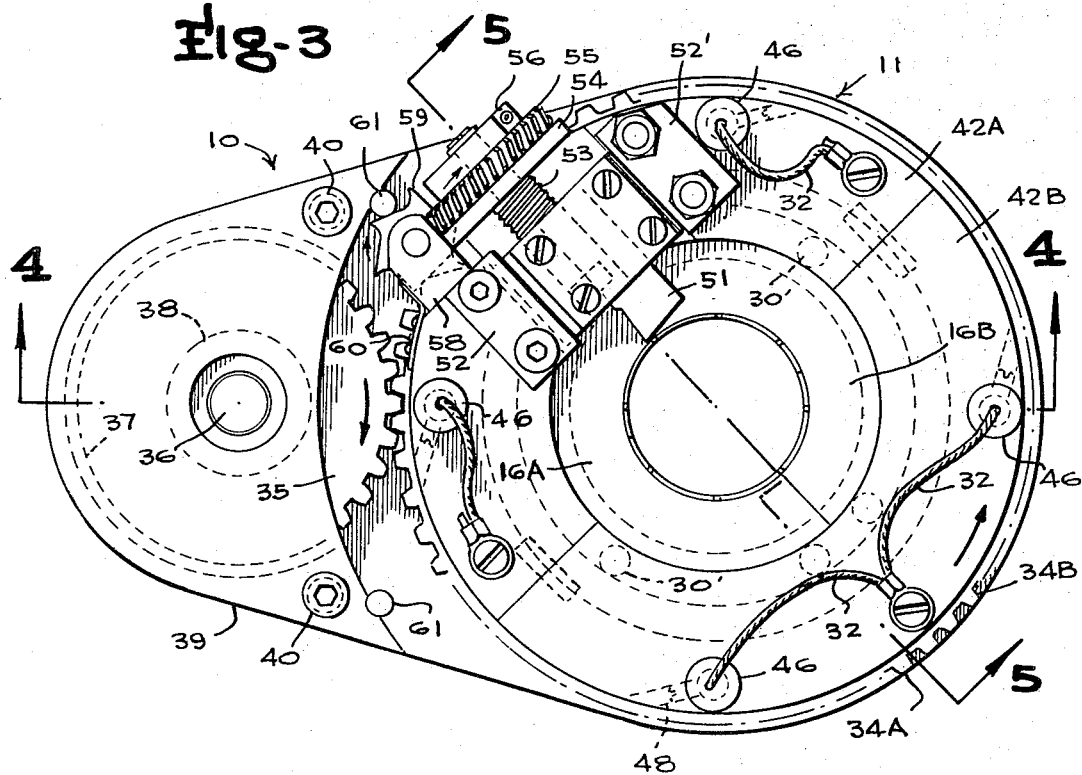
FIG. 3 is a rear side elevation view of the pipe cutting and preparing apparatus, viewed from the opposite side as FIG. 1.

Journaled on and supported by the assembled body segments 16A and 16B is an annular gear 34 formed of gear segments 34A and 34B having gear teeth on their outer periphery and having a flat cylindrical surface at their inner edge which tracks in and is journaled for rotation in surrounding relation to the groove defined at the periphery of the enlarged shoulder portion 25 of the body assembly 16 between the lip 26 and the confronting surface of the housing assembly 12. The gear is driven by a drive pinion 35 surrounding and keyed to a drive shaft 36 journaled in bearings 37 and 38 provided in openings in the extension portion of the female housing member 12A and in a gear retainer cover plate 39 secured to the extension portion of the housing member 12A by suitable screws 40. The drive shaft 36 has a non-round socket or recess, such as a square cross-section socket, indicated at 36A, to receive the drive shaft of a suitable driving tool, such as a pneumatic drive motor, to drive the pinion 35 and gear 34. The gear 34, upon rotation about the axis of the center opening and pipe, carries with it the cutter carriage 42 made up of two semi-circular segments 42A and 42B. The two segments of the cutter carriage ring 42 have semi-circular ribs 43 projecting inwardly from the surfaces defining the semi-circular recesses 44A, 44B forming the center opening of the carriage ring 42 to interfit in the outwardly opening circumferential groove 28 defined by the segments of the annular body assembly 16 adjacent its upper end, as viewed in FIG. 4, to retain the cutter carriage ring 42 in coupled relation with the body assembly 16 when it is assembled thereon. It will be noted from FIG. 8 that guide pins 45 project from the end faces of the semi-circular segment 42A to interfit into mating openings in the confronting end faces of the companion segment 42B to properly locate these two segments in assembled relation. The segments of the cutter carriage ring 42 are releasably maintained in assembled relation with the body assembly and with the gear 34 by means of holding pins or detents 46, best shown in FIG. 4, which are fitted into openings 47 in the carriage ring segments 42A and 42B and extend into sockets or openings 47' alined therewith in the segments 34A, 34B of the gear 34. The holding pins or detents 46 may be releasibly held against accidental withdrawal from the holes 47 by spring urged detent balls, indicated at 48 in FIG. 3 provided in bores in the carriage ring 42 which intersect the holes 47 to project the balls into one or more circumferential grooves in the detent pins 46 as illustrated in FIG. 4. The detent pins 46 are supported against accidental loss by lanyards 32 like those employed for the holding pins 29 previously described. It will be observed from FIGS. 3 and 7 that the diametric plane of separation between the segments 42A and 42B of the cutter carriage ring 42 is angularly displaced 90° from, or is at right angles to, the diametric plane of separation between the segments 16A and 16B of the body assembly 16 and the correspondingly positioned diametric plane of separation between the segments 34A and 34B of the ring gear 34. In this manner, the two detent pins 46 which laterally flank the abutting ends of the carriage ring segments 42A and 42B located at approximately the 7:30 o'clock position illustrated in FIG. 3 fit into holes or sockets in the single ring gear segment 34A, thus securely holding these abutting ends of the carriage ring together, while the opposite abutting ends of the carriage ring segments are held together by the other two detent pins 46 fitting into holes in the single other ring gear segment 34B. Similarly, the pins 29 and 30 adjacent and flanking the two abutting end surfaces of the body segments 16A and 16B and extending through the clips or plates 31 securely hold the two body segments 16A and 16B against separation and portions of the pins 29 and 30, and of the additional pins 30' extend into concave recesses 30a in the surfaces of the semi-circular recess segments 13A and 13B of the housing assembly 12 whose line of separation between the components 12A and 12B thereof is also angularly displaced from the line of separation between the body segments 16A and 16B.

Figure 6:
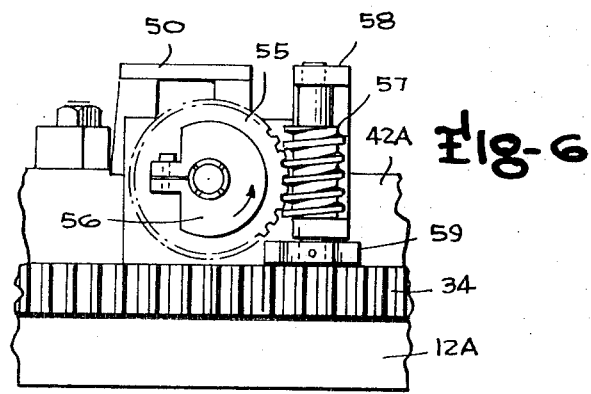
FIG. 6 is a fragmentary elevation view of the cutter tool advancing gear mechanism, viewed from the line 6—6 of FIG. 5.

The carriage segment 42A supports a cutting tool holder 50 mounting a securely held cutting tool 51 and guided for reciprocative movement radially of the pipe axis toward and away from the pipe axis between guide members 52, 52' fastened to the carriage ring segment 42A. The cutting tool holder 50 is precisely advanced and retracted along its radial guide axis by a feed screw 53 threaded into a threaded recess in the cutting tool holder 50 and having a shaft portion journaled in a mounting plate 54 fastened to the carriage ring segment 42A, for example as shown in FIG. 5. Outwardly of the mounting plate 54 is a worm gear 55 held on the shaft of the feed screw 53 by a clamp 56, and engaged with a worm 57 journaled in a worm bracket 58 also fixed to the carriage ring segment 42A. The worm 57 is fixed on a shaft, or has an integral shaft portion extending therefrom, on which is pinned or otherwise fixed a star wheel 59 located closely adjacent to the level of the upper surface of the gear 34, as shown in FIG. 6, but projecting beyond the periphery of the gear 34 and resiliently restrained against angular movement by the star positioning spring member 60. One or more feed pins 61 are positioned in the circular path of movement of the star wheel 59 as it is carried by the carriage ring 42 and gear 34, to rotate the star wheel and the worm through a selected angular distance, for example one-sixth of a revolution, each time the star wheel strikes the feed pin, to advance the cutting tool holder 50 and tool 51 inwardly through a selected small distance at least once each revolution of the gear 34 and carriage ring. Of course if two feed pins 61 are provided in the path of the star wheel, the star wheel, the worm, the worm gear and the tool holder will be advanced twice for each revolution of the gear 34. In the embodiment herein illustrated, the feed pin is introduced from the underside, as viewed in FIG. 4, and has a coil spring 62 surrounding the shank of the feed pin between the enlarged head and the lower surface of the housing 12, the feed pin being held in position by a feed pin retaining bracket 63.

It will be appreciated that the above-described pipe cutting device can be readily assembled about the pipe to be cut. With the housing components 12A and 12B in the open position illustrated in FIG. 8, and the semi-circular segments of the gear 34, collet nut 24, washer 22, collet 20, body 16, and carriage ring 42 in disassembled condition, the collet segments 20A and 20B are assembled about the pipe, together with the washer segments 22A and 22B, and the body segments 16A and 16B are assembled about these two components and about the pipe. The collet nut segments 24A and 24B are then assembled about the pipe and threaded into the threaded portion 18 of the body assembly 16, the ring segments 34A and 34B are assembled around the pipe about the intermediate enlarged diameter shoulder portion 25 of the body assembly 16, and the housing assembly 12 is then assembled about the body assembly and the locking pin 15B is inserted in the opening in the locking ear 15A and in the complementary portions of the female housing member 12A. The pins 29 are then inserted to lock the body segments 16A and 16B together, the cutter carriage ring segments 42A and 42B are assembled about the upper neck portion of the body assembly 16, as viewed in FIG. 4, and the detents 46 are inserted in the holes 47 of the carriage ring segments and the holes 47' of the gear segments 34A and 34B, with the gear segments 34A and 34B oriented to dispose the diametric plane of separation at right angles to the plane of separation of the carriage ring segments. With the feed pins 61, or two feed pins if such are provided, located in their appropriate holes in the female housing member 12A, the shaft of a driving motor, such as a pneumatic driving motor or similar device, can then be inserted into the non-round socket 36A in the drive shaft 36 and the drive shaft 36 and gear 35 thereby rotated to rotate the gear 34 and the carriage ring 42 to appropriately advance the cutting tool holder 50 stepwise through its cutting stroke. By reason of the particular construction herein shown, it is unnecessary to provide much larger diameter components as would be required with typical bolt type assemblies if one were to provide the requisite strength and resistance to stripping of the screw threads, and thus achieve the necessary holding power for a tool of this character. The unique matter in which the semi-circular segments making up the various components of the device are assembled in relation to each other about the pipe and held in proper position against unwanted separation by the plurality of locking pins or detents located parallel to the pipe axis achieves an extremely compact construction permitting the tool to be used for heavy cutting requirements in extremely restricted spaces. The tool, as is customary practice, is shaped so as to not only cut through the pipe but also shape the cut end of the pipe in an appropriate manner for rewelding, the configuration of the tool shown in the accompanying drawing merely being a typical illustration of such a tool.

What is claimed is:

1. A pipe cutting and end preparing device capable of use in severely restricted spaces, comprising plural pairs of semi-circular segments adapted to be assembled together to surround the pipe to be cut, said pairs of segments including pipe gripping means to be cammed into tightly gripping surrounding contact with the pipe, body segments to be assembled into a stationary collar encompassing the pipe gripping means and restrained against movement relative to the latter, and gear segments and carriage ring segments to be coupled together and assembled into a ring gear and carriage ring rotatable together about the collar and supported thereon, drive means for rotating the ring gear and carriage ring about the pipe and collar, a pipe cutting and end shaping tool carried by the carriage ring, means for automatically progressively advancing the tool in discrete steps toward the pipe axis during rotation of the gear and carriage ring to increase the depth of cut, the ring gear and carriage ring having diametric planes of separation between the segments thereof disposed in angularly off-set relation to each other, each carriage ring segment having removable locking pins axially paralleling the pipe axis extending through the respective carriage ring segment into both of the gear segments to hold them in assembled relation about the body segments and pipe, each of the gear segments having a pair of said locking pins extending thereinto which pass through both of the carriage ring segments whereby the carriage ring segments and gear segments are mutually held thereby against separation until said locking pins are manually removed along axial path, said pipe gripping means including a pair of semicircular collet sections and companion semicircular washer segments encircled by said body segments to surround the pipe and having cam surfaces abutting confronting camming surfaces on the body segments, a pair of externally threaded collet nut segments to bear against the washer segments and encircle the pipe, and said body segments having an internally threaded bore portion receiving said collet nut segments.

2. A pipe cutting and end preparing device as defined in claim 1, wherein said means for automatically progressively advancing the tool includes a cutting tool holder slidably mounted on the carriage ring for radial reciprocative movement and supporting the cutting tool, a feed screw for reciprocating said tool holder, a worm and worm gear assembly coupled to the feed screw and to an indexing wheel extending beyond the perimeter of the ring gear and carried in a circular path about the pipe axis during rotation of the ring gear and carriage ring, and at least one stationary feed pin in said circular path of movement of the indexing wheel to intercept and rotate the latter through a selected increment for driving the feed screw to advance the cutting tool through one step.

3. A pipe cutting and end preparing device as defined in claim 1, wherein the plane of separation defined by the ends of said carriage ring segments is perpendicular to the plane of separation defined by the ends of the ring gear segments.

4. A pipe cutting and end preparing device as defined in claim 1, including a pair of arcuate housing members adapted to form a supporting framework surrounding the pipe, the housing members collectively defining an opening to receive and support said collar, the housing members having first and second ends, the first ends being pivotally hinged together for movement between a closed position encircling the collar and an open position wherein the second ends thereof are spaced sufficiently apart to receive the collar and pipe therebetween, and an axially elongated locking pin paralleling the pipe axis at said second end and extending through aligned apertures therefor in adjacent end portions of said housing portion for locking the housing members in closed position surrounding the collar.

5. A pipe cutting and end preparing device as defined in claim 4, wherein the plane of separation defined by the ends of said carriage ring segments is perpendicular to the plane of separation defined by the ends of the ring gear segments and the adjacent ends of said housing members in closed position define a plane of separation which is angularly displaced from the plane of separation of said body segments.

6. A pipe cutting and end preparing device as defined in claim 4, wherein said means for automatically progressively advancing the tool includes a cutting tool holder slidably mounted on the carriage ring for radial reciprocative movement and supporting the cutting tool, a feed screw for reciprocating said tool holder, a worm and worm gear assembly coupled to the feed screw and to an indexing wheel extending beyond the perimeter of the ring gear and carried in a circular path about the pipe axis during rotation of the ring gear and carriage ring, and at least one stationary feed pin fixed on one of said housing members in said circular path of movement of the indexing wheel to intercept and rotate the latter through a selected increment for driving the feed screw to advance the cutting tool through one step.

7. A pipe cutting and end preparing device as defined in claim 6, wherein the plane of separation defined by the ends of said carriage ring segments is perpendicular to the plane of separation defined by the ends of the ring gear segments and the adjacent ends of said housing members in closed position define a plane of separation which is angularly displaced from the plane of separation of said body segments.

8. A pipe cutting and end preparing device as defined in claim 4, wherein one of said housing members supports a pinion gear meshing with said ring gear when the housing members are in closed position and a drive shaft coupled to the pinion gear to be removably coupled with and driven by the output shaft of a portable drive motor.

9. A pipe cutting and end preparing device as defined in claim 2, wherein said means for automatically progressively advancing the tool includes a cutting tool holder slidably mounted on the carriage ring for radial reciprocative movement and supporting the cutting tool, a feed screw for reciprocating said tool holder, a worm and worm gear assembly coupled to the feed screw and to an indexing wheel extending beyond the perimeter of the ring gear and carried in a circular path about the pipe axis during rotation of the ring gear and carriage ring, and at least one stationary feed pin fixed on one of said housing members in said circular path of movement of the indexing wheel to intercept and rotate the latter through a selected increment for driving the feed screw to advance the cutting tool through one step.

10. A pipe cutting and end preparing device as defined in claim 8, wherein the plane of separation defined by the ends of said carriage ring segments is perpendicular to the plane of separation defined by the ends of the ring gear segments and the adjacent ends of said housing members in closed position define a plane of separation which is angularly displaced from the plane of separation of said body segments.

11. A pipe cutting and end preparing device capable of use in severly restricted spaces, comprising plural pairs of semi-circular segments adapted to be assembled together to surround the pipe to be cut, said pairs of segments including pipe gripping means to be cammed into tightly gripping surrounding contact with the pipe, body segments to be assembled into a stationary collar encompassing the pipe gripping means and restrained against movement relative to the latter, and gear segments and carriage ring segments to be coupled together and assembled into a ring gear and carriage ring rotatable together about the collar and supported thereon, drive means for rotating the ring gear and carriage ring about the pipe and collar, a pipe cutting and end shaping tool carried by the carriage ring, means for automatically progressively advancing the tool in discrete steps toward the pipe axis during rotation of the gear and carriage ring to increase the depth of cut, the ring gear and carriage ring having diametric planes of separation between the segments thereof disposed in angularly off-set relation to each other and having removable locking pins axially paralleling the pipe axis extending through the carriage ring segments into the gear segments to hold them in assembled relation about the body segments and pipe, each of the gear segments having a pair of said locking pins extending thereinto which pass through both of the carriage ring segments whereby the carriage ring segments and gear segments are mutually held thereby against separation until said locking pins are manually removed along axial paths, said pipe gripping means including a pair of semicircular collet segments of triangular cross-section and a pair of semi-circular washer segments to collectively encompass the pipe, a pair of externally threaded collet nut segments to bear against the washer segments and encircle the pipe, and said body segments forming said collar having an internally threaded bore portion receiving said collet nut segment and a truncated conical bore portion bearing against said collet segments to force the collet segments to grip the pipe responsive to rotation of the assembled collet nut segments against the assembled washer segments.

12. A pipe cutting and end preparing device as defined in claim 11, wherein said means for automatically progressively advancing the tool includes a cutting tool holder slidably mounted on the carriage ring for radial reciprocative movement and supporting the cutting tool, a feed screw for reciprocating said tool holder, a worm and worm gear assembly coupled to the feed screw and to an indexing wheel extending beyond the perimeter of the ring gear and carried in a circular path about the pipe axis during rotation of the ring gear and carriage ring, and at least one stationary feed pin in said circular path of movement of the indexing wheel to intercept and rotate the latter through a selected increment for driving the feed screw to advance the cutting tool through one step.

13. A pipe cutting and end preparing device as defined in claim 12, including a pair of arcuate housing members adapted to form a supporting framework surrounding the pipe, the housing members collectively defining an opening to receive and support said collar, the housing members having first and second ends, the first ends being pivotally hinged together for movement between a closed position encircling the collar and an open position wherein the second ends thereof are spaced sufficiently apart to receive the collar and pipe therebetween, and locking means at said second ends for locking the housing members in closed position surrounding the collar.

14. A pipe cutting and end preparing device as defined in claim 11, including a pair of arcuate housing members adapted to form a supporting framework surrounding the pipe, the housing members collectively defining an opening to receive and support said collar, the housing members having first and second ends, the first ends being pivotally hinged together for movement between a closed position encircling the collar and an open position wherein the second ends thereof are spaced sufficiently apart to receive the collar and pipe therebetween, and locking means at said second ends for locking the housing members in closed position surrounding the collar.

15. A pipe cutting and end preparing device as defined in claim 14, wherein one of said housing members supports a pinion gear meshing with said ring gear when the housing members are in closed position and a drive shaft coupled to the pinion gear to be removable coupled with and driven by the output shaft of a portable drive motor.

16. A pipe cutting and end preparing device as defined in claim 14, wherein the plane of separation defined by the ends of said carriage ring segments is perpendicular to the plane of separation defined by the ends of the ring gear segments and the adjacent ends of said housing members in closed position define a plane of separation which is angularly displaced from the plane of separation of said body segments.

17. A pipe cutting and end preparing device capable of use in severely restricted spaces, comprising a pair of arcuate housing sections pivotally connected together at one end of the sections for movement between open and closed positions and defining an encircling surround about the pipe to be cut having a circular housing opening when in closed position, a pair of semi-circular annular body segments forming a segmented collar to be fitted together about the pipe as an axis and mounted in the housing opening and having a central body opening for the pipe, a pair of semi-circular collet segments and companion semi-circular washer segments removably fitted in said central body opening to surround the pipe and having cam surfaces abutting confronting camming surfaces on the body segments, a pair of semi-circular threaded collet nut segments threaded in said central body opening in surrounding relation to the pipe to force said washer and collet segments against said camming surfaces and cam the collet into tightly gripping relation to the pipe exterior surface, a pair of semi-circular ring gear segments assembled in surrounding relation to the assembled body segments to rotate about the latter, a pair of semi-circular carriage ring segments to be assembled into a carriage ring about the pipe and a portion of the body segments to rotate about the latter, means releasibly connecting said carriage ring to said gear segments to be rotated by the latter, drive means for rotating the ring gear formed by the assembled gear segments, a pipe cutting and shaping tool carried by the carriage ring to progressively cut the pipe and shape the cut end upon rotation of the carriage ring and gear about the pipe as an axis, means for automatically progressively advancing the tool in increments toward the pipe axis during rotation of the carriage ring to increase the depth of cut, the ring gear and carriage ring having diametric planes of separation between the segments thereof disposed in angularly off-set relation to each other and having removable locking pins axially paralleling the pipe axis extending through the carriage ring segments into the gear segments to hold them in assembled relation about the body segments and pipe, each of the gear segments having a pair of said locking pins extending thereinto which pass through both of the carriage ring segments whereby the carriage ring segments and gear segments are mutually held thereby against separation until said locking pins are manually removed along axial paths.

18. A pipe cutting and end preparing device as defined in claim 17, wherein said means for automatically progressively advancing the tool includes a cutting tool holder slidably mounted on the carriage ring for radial reciprocative movement and supporting the cutting tool, a feed screw for reciprocating said tool holder, a worm and worm gear assembly coupled to the feed screw and to an indexing wheel extending beyond the perimeter of the ring gear and carried in a circular path about the pipe axis during rotation of the ring gear and carriage ring, and at least one stationary feed pin in said circular path of movement of the indexing wheel to intercept and rotate the latter through a selected increment for driving the feed screw to advance the cutting tool through one step.

19. A pipe cutting and end preparing device as defined in claim 17, wherein one of said housing members supports a pinion gear meshing with said ring gear when the housing members are in closed position and a drive shaft coupled to the pinion gear to be removably coupled with and driven by the output shaft of a portable drive motor.

20. A pipe cutting and end preparing device as defined in claim 19, wherein said means for automatically progressively advancing the tool includes a cutting tool holder slidably mounted on the carriage ring for radial reciprocative movement and supporting the cutting tool, a feed screw for reciprocating said tool holder, a worm and worm gear assembly coupled to the feed screw and to an indexing wheel extending beyond the perimeter of the ring gear and carried in a circular path about the pipe axis during rotation of the ring gear and carriage ring, and at least one stationary feed pin in said circular path of movement of the indexing wheel to intercept and rotate the latter through a selected increment for driving the feed screw to advance the cutting tool through one step.

\* \* \* \* \*

UNITED STATES PATENT AND TRADEMARK OFFICE
CERTIFICATE OF CORRECTION

PATENT NO. : 3,839,791
DATED : October 8, 1974
INVENTOR(S) : WILLIAM C. FEAMSTER, III It is certified that error appears in the above-identified patent and that said Letters Patent are hereby corrected as shown below:

Column 2, line 16, "anc" should read --and--

Column 7, line 19, "path" should read --paths--

Column 8, line 37, the numeral "2" should read --8--

Signed and Sealed this eighteenth Day of November 1975

[SEAL]

Attest:

RUTH C. MASON
Attesting Officer

C. MARSHALL DANN
Commissioner of Patents and Trademarks